United States Patent [19]
Hayashi et al.

[11] Patent Number: 5,363,163
[45] Date of Patent: Nov. 8, 1994

[54] FINDER OPTICAL SYSTEM FOR PSEUDO FOCAL LENGTH

[75] Inventors: Kohtaro Hayashi, Suita; Hiromu Mukai, Kawachinagano; Yoshinobu Kudo, Osaka, all of Japan

[73] Assignee: Minolta Camera Kabushiki Kaisha, Osaka, Japan

[21] Appl. No.: 882,275

[22] Filed: May 13, 1992

[30] Foreign Application Priority Data

| May 14, 1991 | [JP] | Japan | 3-139728 |
| Jul. 15, 1991 | [JP] | Japan | 3-201398 |
| Jul. 15, 1991 | [JP] | Japan | 3-201399 |
| Sep. 18, 1991 | [JP] | Japan | 3-268214 |
| Oct. 7, 1991 | [JP] | Japan | 3-289276 |

[51] Int. Cl.⁵ ............................................. G03B 13/10
[52] U.S. Cl. .................................................. 354/155
[58] Field of Search ............... 354/199, 200, 201, 155, 354/219, 224, 225, 222

[56] References Cited

U.S. PATENT DOCUMENTS

| 4,583,831 | 4/1986 | Harvey | 354/106 |
| 4,757,372 | 7/1988 | Betensky et al. | 354/155 X |
| 4,910,545 | 3/1990 | Fujibayashi et al. | 354/225 |
| 4,955,715 | 9/1990 | Kitagishi | 354/155 |

FOREIGN PATENT DOCUMENTS

| 57-74719 | 5/1982 | Japan . |
| 1101530 | 4/1989 | Japan . |
| 1103071 | 4/1989 | Japan . |
| 1231013 | 9/1989 | Japan . |
| 1319723 | 12/1989 | Japan . |
| 1319724 | 12/1989 | Japan . |
| 1319725 | 12/1989 | Japan . |

OTHER PUBLICATIONS

Popular Photography Jan. 1988, vol. 95, No. 1, Keppler's Slr World by Herbert Keppler pp. 66 & 68.

*Primary Examiner*—W. B. Perkey
*Attorney, Agent, or Firm*—Price, Gess & Ubell

[57] ABSTRACT

A finder optical system is shown which includes a photo-taking lens, a mirror reflecting light rays passed through the photo-taking lens upward, a focusing screen on which a first object image is formed, a relay lens system through which the first object image is reformed as a second object image smaller than the first object image, and an eye piece which enlarges second object image. The relay lens system is located above the focusing screen and parallel to an optical axis of the photo-taking lens. The finder optical system allows for compactness in both depth and height.

11 Claims, 16 Drawing Sheets

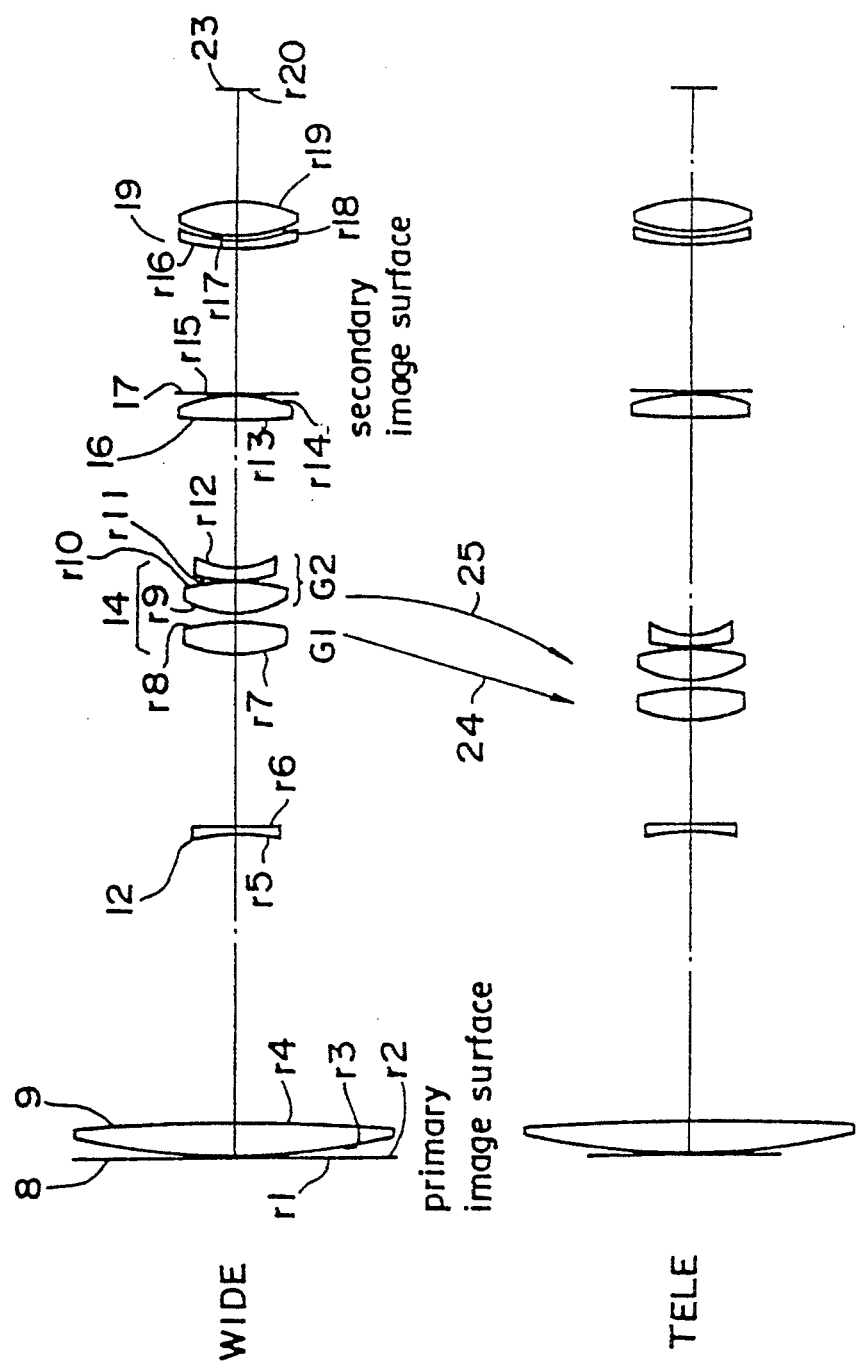

FIG. 4A
WIDE
height of entrance pupil 2 mm

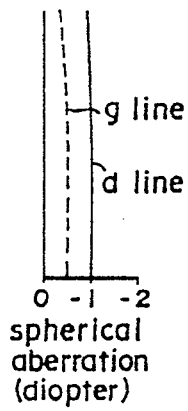

spherical aberration (diopter)

FIG. 4B
TK=20.0mm

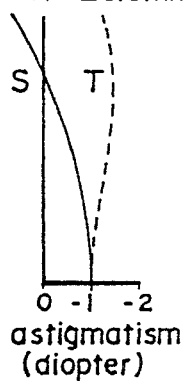

astigmatism (diopter)

FIG. 4C
TK=20.0mm

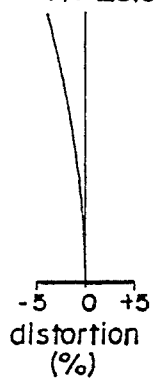

distortion (%)

FIG. 4D
TK=20.0mm

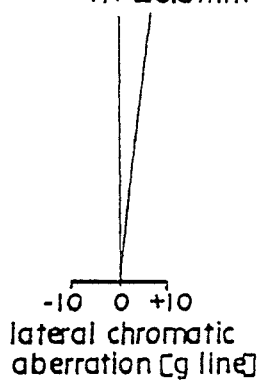

lateral chromatic aberration [g line]

FIG. 4E
MIDDLE
height of entrance pupil 2 mm

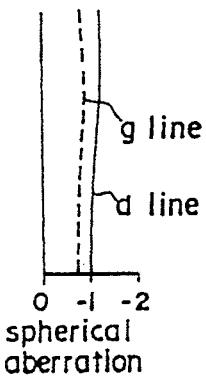

spherical aberration

FIG. 4F
TK=14.3mm

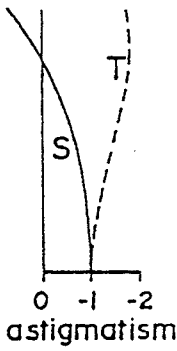

astigmatism

FIG. 4G
TK=14.3mm

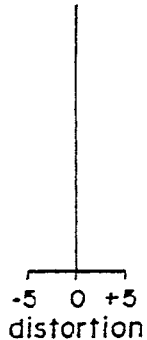

distortion

FIG. 4H
TK=14.3mm

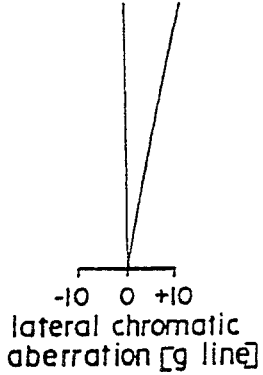

lateral chromatic aberration [g line]

FIG. 4I
TELE
height of entrance pupil 2mm

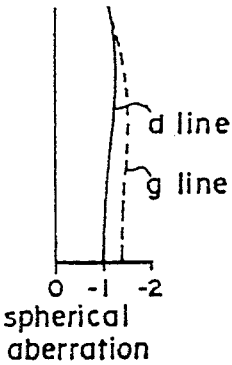

spherical aberration

FIG. 4J
TK=11.8mm

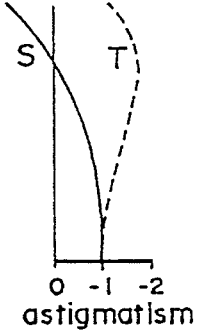

astigmatism

FIG. 4K
TK=11.8mm

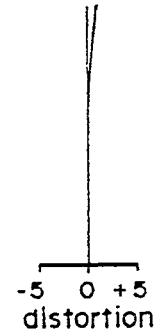

distortion

FIG. 4L
TK=11.8mm

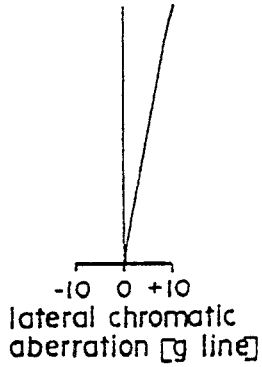

lateral chromatic aberration [g line]

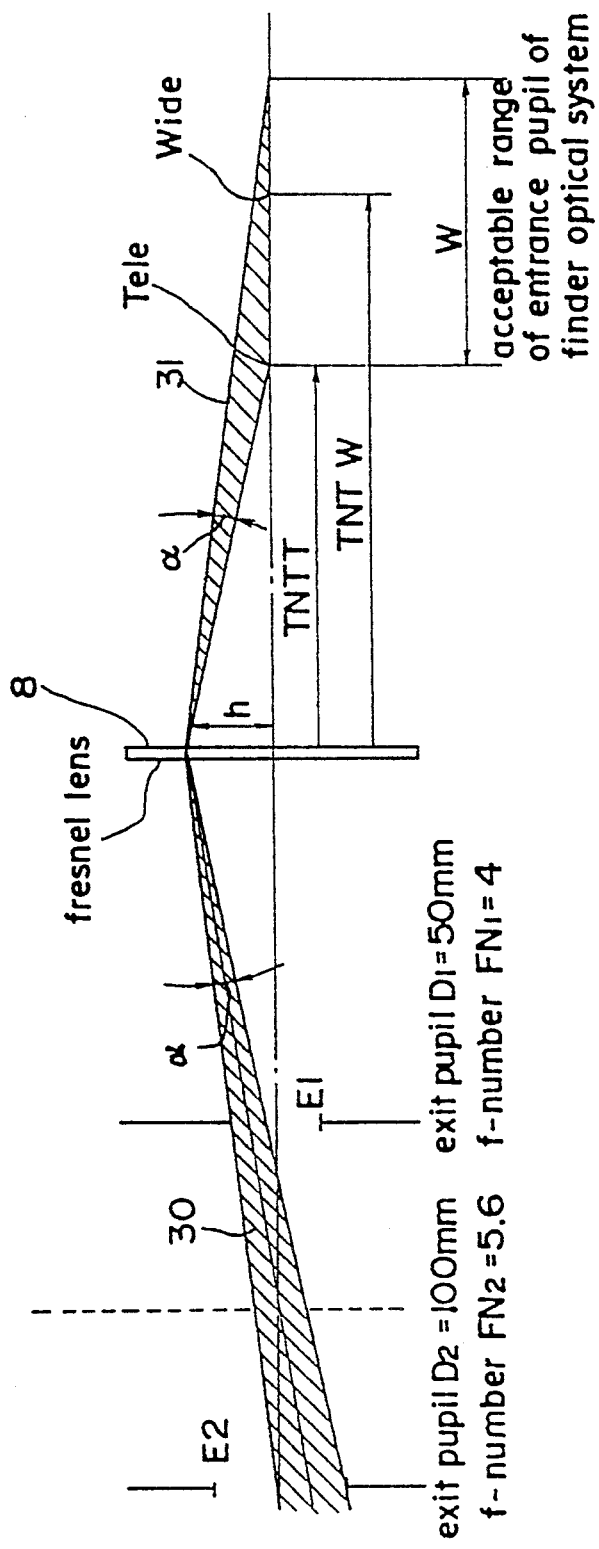

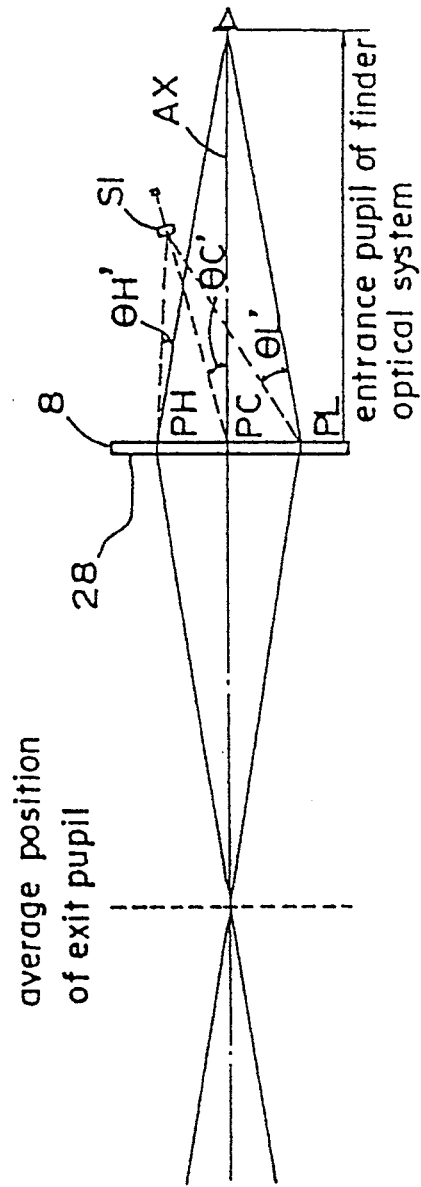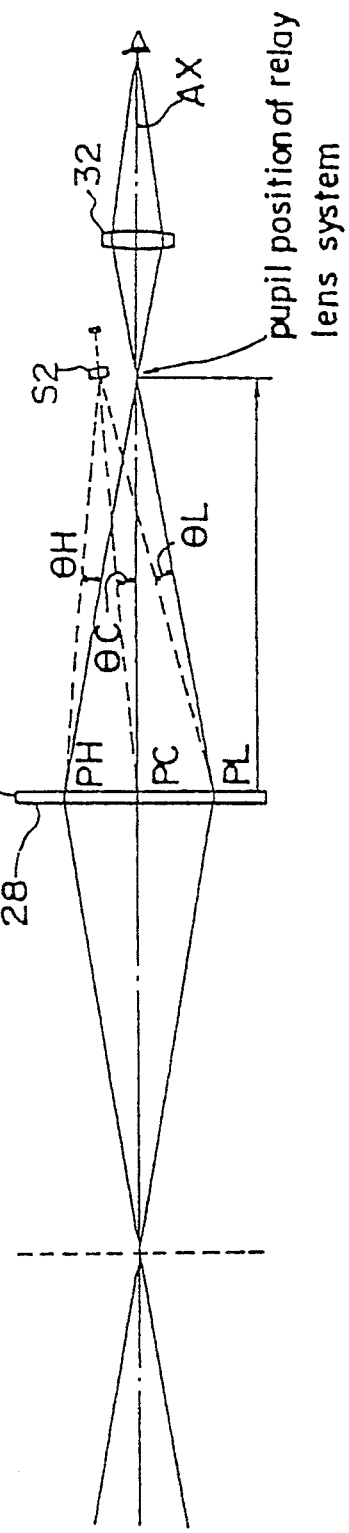

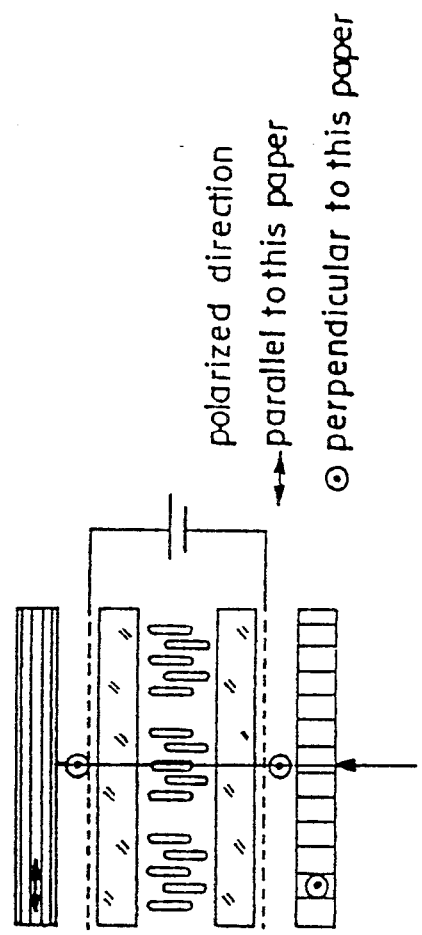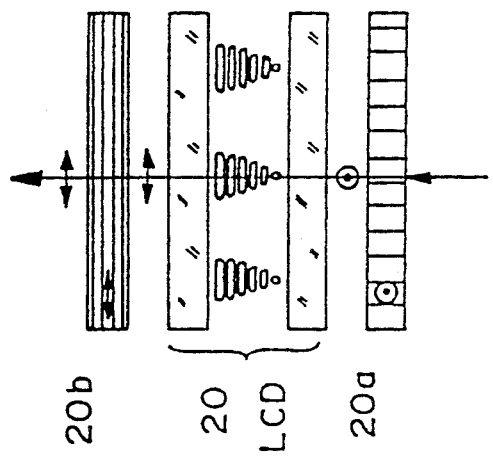

FINDER OPTICAL SYSTEM FOR PSEUDO FOCAL LENGTH

BACKGROUND OF THE INVENTION

1. Field of the Invention

This invention relates to a finder optical system for a single-lens reflex camera.

2. Description of the Prior Art

Among TTL-type finder optical systems which utilize the light rays traversing the photo-taking lens as rays for the finder, an optical system employing a relay optical system allowing the inverted image formed by the photo-taking lens to be observed as an erect image has been proposed. In this finder optical system, an erect image can be obtained by re-forming the primary image, which is an inverted image formed by the photo-taking lens, into a secondary image by means of a relay optical system. However, because a relay optical system requires a considerably lengthened light path, mounting a finder optical system with a relay optical system into a camera has entailed the necessity of increasing the height or depth of the camera.

A trimming system has also been recently proposed. As shown in FIG. 6(a), a trimming system is a system wherein trimming information that specifies a certain area A (trimming area) of film 5 is stored in a prescribed location 51 of the film at the time of photographing. Based on the trimming information, only the trimming area A is enlarged and printed on the photographic paper shown in FIG. 6(b) at the time of printing. (This mode in which trimming information is stored is hereinafter referred to as the "pseudo focal length mode".) Where the above-referenced finder optical system is mounted in a camera equipped with a pseudo focal length mode, it is possible to use the variable power of the relay optical system in order to enlarge the trimming area to an area as large as the finder field frame. However, in order to change the magnification in the relay optical system, space to allow movement of the relay optical system on the optical axis is needed, which entails the necessity of further increasing the camera size.

In addition, when a finder optical system other than that referenced above is mounted in a camera equipped with a pseudo focal length mode, the problem described below occurs. Namely, in the case of photo-taking lenses where the location of exit pupil changes (i.e., exchangeable lenses and zoom lenses), if the power is changed in the finder optical system, vignetting may occur depending on the location of the exit pupil of the photo-taking lens (details are explained in the DETAILED DESCRIPTION OF THE PREFERRED EMBODIMENTS). This is because the position of the entrance pupil of the finder optical system changes with the change of power; so far, no prior art is known to consider this point.

Further, let us examine the conventional light-measuring optical system of a single-lens reflex camera. Normally, the light-measuring optical system is structured so that a portion of the light rays transmitted through the finder optical system is utilized; however, it has been impossible to perform precise light measurement while maintaining the brightness of the finder image (details are explained in the DETAILED DESCRIPTION OF THE PREFERRED EMBODIMENTS).

Finally, let us examine the in-finder display of a camera equipped with a pseudo focal length mode. It has already been mentioned that the variable power of the finder optical system is exploited in a camera equipped with a pseudo focal length mode. Because an in-finder display is generally performed by means of a display device located close to the primary image, if the magnification of the finder optical system is changed, vignetting may occur in the periphery of the display, or the display may not be seen in an appropriate location and/or size in relation to the field frame. On the other hand, the magnification of the display of the focus detection area and light-measuring area, which exist in fixed relation to the primary image, must change in response to the change in magnification of the finder optical system.

SUMMARY OF THE INVENTION

An object of this invention is to provide a finder optical system having a relay optical system, which allows for compactness in both depth and height.

Another object of this invention is to provide a finder optical system having a variable-magnification relay optical system, which allows for compactness in depth and height.

Another object of this invention is to provide a variable-magnification finder optical system not causing vignetting regardless of the position of the exit pupil of the photo-taking lens.

Another object of this invention is to provide a finder optical system capable of performing precise light measurement without darkening the finder image.

Another object of this invention is to provide a finder optical system having a relay optical system, wherein a display device to perform an in-finder display required in pseudo focal length mode is specially located.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 2 is a development of the post-primary image surface finder optical system as represented in the first embodiment of the present invention.

FIGS. 4a–4l are illustrations of aberrations of the finder optical system as represented in the first embodiment of the present invention.

FIG. 5 is an explanatory illustration of vignetting in the finder optical system.

FIGS. 7a and 7b are an explanatory illustration of the location of the light-measuring optical system.

FIGS. 10a and 10b are an explanatory illustration of the operating principles of a conventional TN (twisted nematic) liquid crystal.

DETAILED DESCRIPTION OF THE PREFERRED EMBODIMENTS

Figure 1:
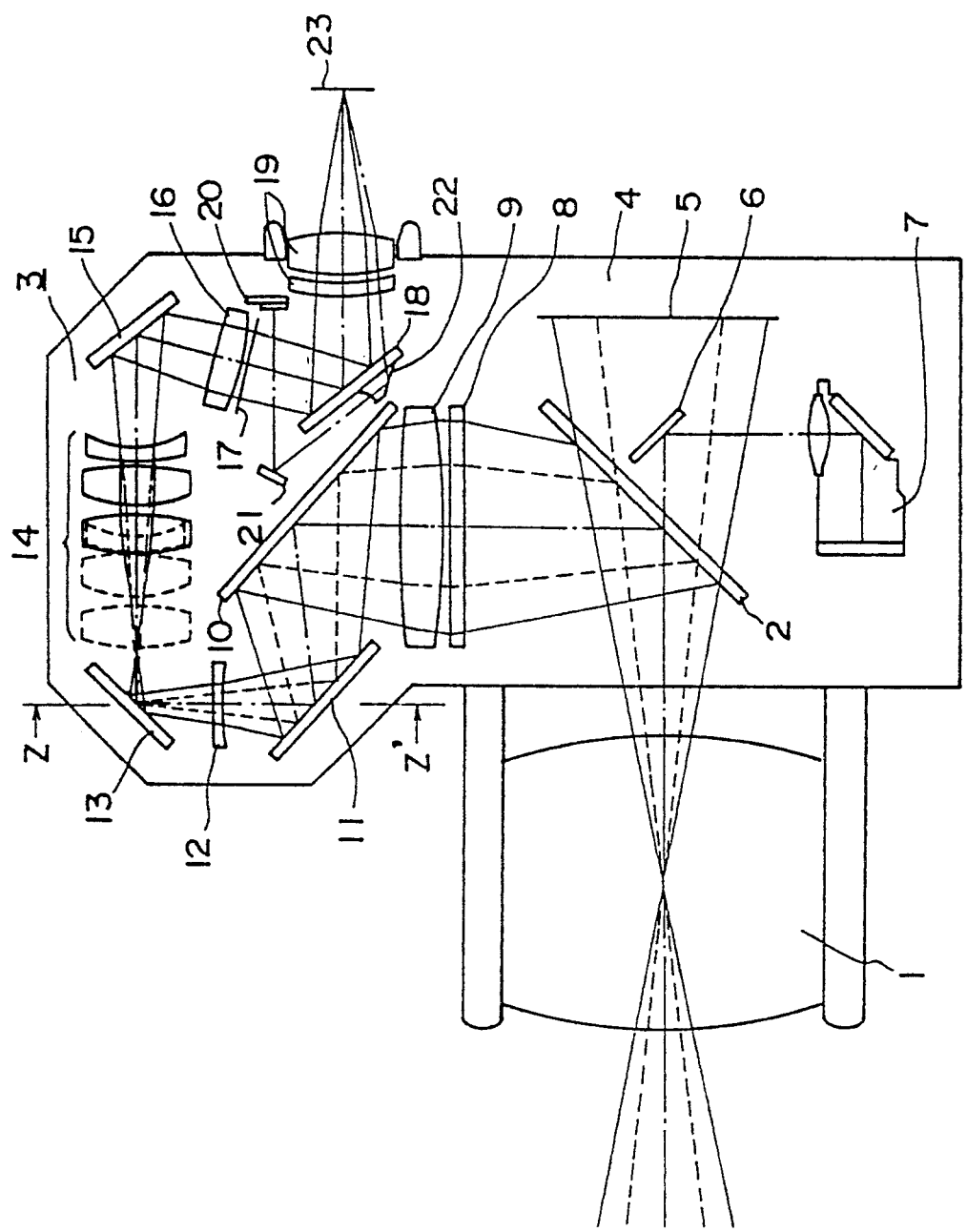
FIG. 1 is a sectional view of a camera having a finder optical system as represented in the first embodiment of the present invention.

FIG. 1 shows the structure of the finder optical system of a camera embodying the present invention. In the figure, 1 is a photo-taking lens, which is usually detachable from camera body 4. 2 is a main mirror to lead the light coming in through the above-mentioned photo-taking lens 1 toward finder optical system 3 above, and is located inside camera body 4. 5 illustrates film. 6 is an AF auxiliary mirror which directs a portion of the light from photo-taking lens 1 toward AF (autofocus detection) sensor module 7.

Finder optical system 3 comprises focusing screen 8, which becomes the primary image surface on which the primary image is formed by a photo-taking lens 1, first condenser 9, first mirror 10, which directs the light from condenser 9 forward, second mirror 11, which directs the light from first mirror 10 upward, auxiliary lens (for zoom relay lens system 14) 12, which forms a reduced virtual image of the primary image on the aforementioned focusing screen 8 closer to the pupil than the focusing screen 8, third mirror 13, which directs the light from auxiliary lens 12 parallel to the optical axis of photo-taking lens 1 as well as backward, zoom relay lens system 14, employed in pseudo focal length mode, fourth mirror 15, which directs the light from zoom relay lens system 14 downward, second condenser 16, field frame 17 located in the position of the secondary image surface on which the secondary image is formed, fifth mirror 18, which directs the light coming through field frame 17 parallel to the optical axis of photo-taking lens 1 as well as backward, and fixed eye piece 19. Further, LCD (liquid crystal display) 20, which forms letters, symbols, etc. to be displayed, in-finder auxiliary mirror 21 and in-finder prism 22 for the so-called in-finder display to display shutter speed, stop setting, etc., are located in the respective positions shown in the drawing. 23 indicates the position of the pupil.

In FIG. 1, the light rays traversing photo-taking lens 1 are bent upward by main mirror 2 and form an image on focusing screen 8. The light rays, having formed an primary image on the primary image surface on focusing screen 8, are then bent forward (to the direction of the object) by first mirror 10 via condenser 9 and further bent upward by second mirror 11. After passing through auxiliary lens 12, they are bent backward by third mirror 13.

Next the light rays pass through zoom relay lens system 14 and are bent downward by fourth mirror 15. They then reform a secondary image on the same surface of field frame 17 via condenser 16. The light rays, having formed a secondary image, are now directed backward by fifth mirror 18 and reach pupil position 23 through eye piece 19. In this embodiment, a total of six mirrors, i.e., main mirror 2 and first through fifth mirrors 10, 11, 13, 15 and 18, are employed, and with an even number of the mirrors, the image finally seen in the finder optical system is an erect image.

Zoom relay lens system 14 is structured so that by moving forward and backward on its optical axis, the image magnification of the secondary image surface in relation to the primary image surface changes according to the trimming magnification, while the conjugate relation between two image surfaces remains unchanged.

Figure 6A:
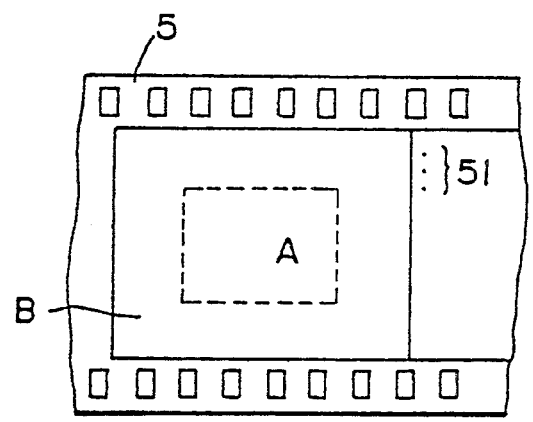
FIGS. 6a and 6b are an explanatory illustration of the trimming system.
Figure 6B:
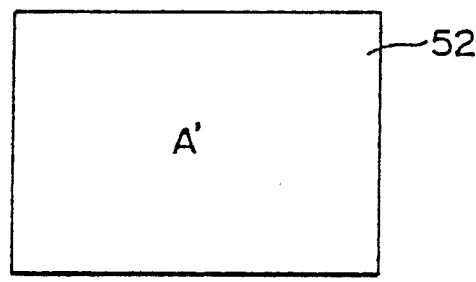

In this embodiment, as discussed below, the image magnification of zoom relay lens system 14 changes from 0.34 (wide-angle mode) to 0.578 (telephoto mode). Because of the restriction by field frame 17, in wide-angle mode only the light rays in the range shown by solid lines pass through, and in telephoto mode only the light rays in the range shown by dotted lines pass through. Therefore, on film 5, in wide-angle mode the solid line range is the photo range and in telephoto mode the dotted line range is the photo range. The information on the magnification of zoom relay lens system 14, or namely, the information on the photo range, is stored in an appropriate part (for example, in a prescribed part 51 shown in FIG. 6) of film 5 at the time the photo is taken. By performing enlargement at the time of printing based on this information, pseudo focal length mode operation employing trimming is possible.

FIG. 2 shows the lens structure as drawn by viewing the optical process after focusing screen 8. Details of the relay optical system (auxiliary lens 12 and zoom relay lens system 14) in this embodiment are described using this figure. Here auxiliary lens 12 comprises one concave lens and zoom relay lens system 14 comprises, in order from the side of the object, first group G1, comprising a positive lens having two convex surfaces, and second group G2, comprising a positive lens having two convex surfaces and a negative lens having a concave surface on the side of the image. These lens groups move on their optical axis when zooming from the shortest focal length to the longest focal length, as indicated by the arrows 24 and 25.

The magnification of the entire relay optical system is 0.34 in wide-angle mode and 0.578 in telephoto mode; it is a reduction-based optical system. Because of this, the secondary image surface can be made smaller than the primary image surface and the light path can be narrowed. Moreover, because a short focal distance in eye piece 19 will provide the same magnification as conventional finder optical systems, the whole unit can be made compact.

Auxiliary lens 12 reduces the primary image surface and forms a virtual image whose position is closer to the pupil. This shortens the virtual conjugate distance of zoom relay lens system 14. By changing the magnification mode from wide-angle to telephoto at or around magnification level 1, the movement of zoom relay lens system 14 by zooming can be reduced.

Figure 3A:
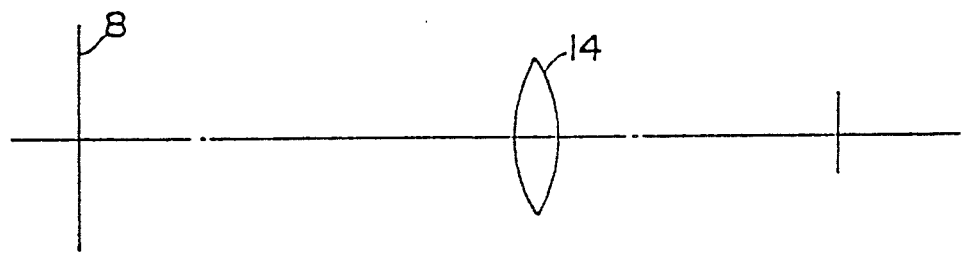
FIGS. 3a and 3b are an explanatory illustration of the role of the auxiliary lens in the relay optical system.
Figure 3B:
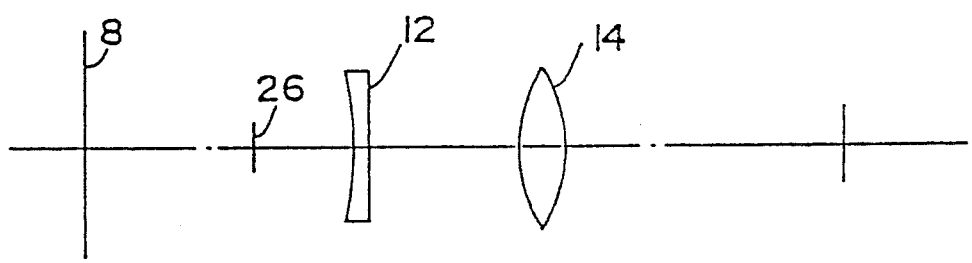

As shown in FIG. 3(a), for example, when zoom relay lens system 14 is designed as an optical system which reduces the primary image surface into the second image surface with a 0.34 relative magnification at the shortest focal length, if, as in the case of this embodiment, auxiliary lens 12 comprising a concave lens is inserted between the primary image surface and zoom relay lens system 14, then, as shown in FIG. 3(b), a reduced primary image 26 is formed as a virtual image at a point closer to the pupil than focusing screen 8 (the primary image surface). And, if the reduced primary image 26 is approximately 0.485 times as large as the original primary image 8, a magnification of approximately 0.7 is sufficient for zoom relay lens system 14.

On the other hand, using the same principle, in order to obtain a magnification of 0.578 at the longest focal length, it is sufficient if the zoom relay lens system has a magnification of approximately 1.19.

As is well known, the zooming movement of a zoom lens system can be the shortest when the system is designed so that magnification changes at a magnification level of 1. Therefore, by inserting auxiliary lens 12 as explained above, the magnification range ranges from 0.7 (at the shortest focal length) to 1.19 (at the longest focal length), and as a result the movement of zoom relay lens system 14 can be reduced, which, to the same degree, permits a reduction in the depth of the finder optical system. That is, as shown in FIG. 1, by placing third mirror 13 between auxiliary lens 12 and zoom relay lens system 14, only the three—i.e., positive, positive and negative—lenses of zoom relay lens system 14 remain to be aligned on one axis. This reduces the front-to-rear length of the zoom relay lens system, and since it is designed to minimize the movement of these lenses, the distance of necessary front-rear movement is short, even considering the space for movement of the lenses, thereby allowing compact construction.

The secondary image formed through reduction by the aforementioned relay optical system on the same plane as field frame 17 is observed in enlargement through eye piece 19. At this time, in order to secure a reasonable enlargement, the power of eye piece 19 will be large. Therefore, the focal distance of eye piece 19 may be short.

Next, the in-finder display optical system is explained. First, the display light from LCD 20 is reflected by in-finder auxiliary mirror 21 and enters in-finder prism 22. This in-finder prism 22 is a lens having a negative power on the entrance side, by which the prism forms an reduced image of LCD 20 at a point where the optical distance from the prism is the same as that from the second image surface. The LCD image reduced by in-finder prism 22 passes through the clear portion of fifth mirror 18 and is seen at the bottom of the field of view through eye piece 19.

Since the focal distance of eye piece 19 of this embodiment is approximately one-third of that of the eye piece of a conventional single-reflex camera, if an LCD employed in a conventional single-reflex camera were used without reduction, the display would appear about three times as large. This would not allow the display of much information because the size of the field of view is limited. In such a case, if the pattern of LCD 20 were made smaller, the same amount of information as in conventional single-reflex cameras could be displayed; however, this is difficult at the current level of technology. In this embodiment, since a reduction-based optical system is employed for the in-finder display optical system, the same amount of information can be displayed using the same pattern as existing LCDs.

Incidentally, photo-taking lens 1 is exchangeable. Lenses of various focal distances may be mounted onto camera body 4. Even if the lens is not exchangeable, in case of a zoom-type photo-taking lens, the same principle applies here as to exchangeable lenses, in that focal distance varies. In this embodiment, the design is such that vignetting of the finder image does not occur with magnification changes in finder optical system 3, even when such a photo-taking lens is mounted. This point is explained in detail below.

FIG. 5 illustrates optical progress from photo-taking lens 1 through focusing screen 8.

Photo-taking lens 1 is exchangeable. Lenses having various focal distances and F-numbers are mounted onto the camera. These have different exit pupils, and the direction of the light rays coming through the photo-taking lens varies depending on the lens. With photo-taking lenses in conventional single-reflex cameras, the position of the exit pupil ranges from 50 mm to 100 mm from the focal plane. Those with large F-numbers have an F-number equal to 4–5.6.

FIG. 5 shows exit pupil E1 with position D1=50 mm and F-number FN1=4, as well as exit pupil E2 with position D2=100 mm and F-number FN2=5.6. At height h on focusing screen 8, the range in which the light rays come from both exit pupils is the shaded area 30. The angle formed by these light rays is represented by $\alpha$.

Height h in the standard mode (wide-angle mode) is approximately 20 mm at the maximum when 135 film is used. If in trimming mode (telephoto mode) the maximum trimming magnification is approximately 1.7, then the height h in trimming mode will become 11.8 mm. Therefore $\alpha$, when the trimming magnification is 1.7, is expressed by:

$$\alpha \approx (\tfrac{1}{2}FN2)+(\tfrac{1}{2}FN1)+\{(1/D2)-(1/D1)\}h=0.096 \text{ (radian)} \quad (1)$$

The light rays are bent by the Fresnel lens on focusing screen 8 so that the light reaches the pupil through finder optical system 3. The bending of the light rays by the Fresnel lens changes angle $\alpha$ (i.e., the angle formed by the light rays as shown as shaded area 31) hardly at all.

Actual focusing screen 8 has a diffusing surface. However, recent focusing screens have low diffusibility in order to improve the brightness of the finder optical system and thus an increase in the width of the light rays through diffusion cannot be expected.

In this embodiment, changes in magnification in zoom relay lens system 14 in the finder optical system change the focal length of finder optical system 3, thereby changing the finder magnification: at this point, however, the position of the virtual image of the pupil (namely, the place where observation is made by the eye) (hereinafter referred to as the "entrance pupil of finder optical system 3") seen through finder optical system 3 from focusing screen 8 changes.

For example, even if the light rays are directed toward the entrance pupil of finder optical system 3 by means of the Fresnel lens on focusing screen 8 in wide-angle mode, if the entrance pupil for finder optical system 3 moves significantly when the mode is shifted into telephoto, the light might not reach the pupil. However, in such a case, vignetting of the finder image will occur. In order to avoid vignetting, the entrance pupil must move within the acceptable range W of entrance pupil for finder optical system 3 in FIG. 5 when the mode is shifted from wide-angle to telephoto or vice versa.

If the distance from focusing screen 8 to the front principal point, measured toward the finder optical system (as measured from the focusing screen and the right hand side (pupil side) is deemed positive) is F, and the distance from the pupil to the rear principal point, measured toward the finder optical system (as measured from the pupil) is B, the position INT of the entrance pupil of finder optical system 3 is expressed as follows:

$$INT = F + 1/\{(1/-B) - 1/F\} = F^2/(F+B) \quad (2)$$

Using W and T to indicate wide-angle mode and telephoto mode, respectively, the difference in angle to the finder entrance pupil from height h on focusing screen 8 is:

$$\alpha' = (h/INTW) - (-h/INTT) = h\{(FW+BW)/FW^2 - (FT+BT)/FT^2\} \quad (3)$$

If the relation of this difference to $\alpha$, which is predetermined by the photo-taking lens, satisfies $-\alpha \leq \alpha' \leq \alpha$, the entrance pupil for finder optical system 3 can be within acceptable range W. Since when the trimming magnification is 1.7, height h is h=11.8 and $\alpha$=0.096 according to the above formula (1), $$(FW+BW)/FW^2 - (FT+BT)/FT^2 \quad (4)$$

is acceptable when satisfying $$-0.008 \leq (FW+BW)/FW^2 - (FT+BT)/FT^2 \leq 0.008 \quad (5)$$

The values ±0.008 in the above conditional formula (5) vary according to the magnification change ratio in pseudo focal length mode (i.e., trimming magnification). In other words, the values vary based on telephoto magnification EZ in relation to wide-angle magnification. This is expressed as:

$$\pm(EZ \times 0.0107 - 0.01) \quad (6)$$

Therefore, formula (5) is expressed more generally as follows:

$$-(EZ \times 0.0107 - 0.01) \leq (FW + BW)/FW^2 - \quad (7)$$
$$(FT + BT)/FT^2 \leq (EZ \times 0.0107 - 0.01)$$

The values for the formula (6) vary as shown in the following table, depending on trimming magnification EZ:

| EZ | Values of formula (6) |
|---|---|
| 1.4 | ±0.005 |
| 1.7 | ±0.008 |
| 2.0 | ±0.011 |

Although [the absolute value] of formula (6) increases as the value of EZ increases (i.e., the acceptable range W widens), because the degree of lens movement due to a change in magnification also increases, the finder entrance pupil might move considerably. This would make designing difficult.

In the case of finder optical systems containing a relay optical system as in the case of this embodiment, the value of formula (4) can be made to satisfy condition (7) through adjusting the power of second condenser 16.

If the magnifications for the relay optical system are $\beta W$ and $\beta T$ (both negative) and its refractive powers are $\phi W$ and $\phi T$, then, $$EXT = (\beta W^2 - \beta T^2)/(\beta W \cdot \phi W - \beta T \cdot \phi T)$$

which is the position of the exit pupil of the relay optical system (measured from the secondary image surface). If the power of second condenser 16 is adjusted so that the exit pupil becomes closer to having a conjugate relation with the entrance pupil of the eye piece system, then the position of the entrance pupil for the entire finder optical system becomes the same both in wide-angle and telephoto modes, thereby bringing the value of formula (4) closer to 0.

In this embodiment, $$FW = -78.75$$

$$BW = +135.75$$

$$FT = -43.40$$

$$BT = +64.14$$

Therefore, $$(FW+BW)/FW^2 - (FT+BT)/FT^2 = -0.0018$$

is obtained, which sufficiently meets the necessary condition.

As one optical system which changes the magnification of the finder optical system, a type of system wherein a magnifier is placed between the pentaprism and the eye piece has been proposed, as in Patent No. S57-74719. This does not increase the magnification for pseudo focal length mode, as in the present invention, but magnifies the central area of the finder only. Now, assuming the standard mode is the wide-angle mode and the magnified mode is the telephoto mode, let us calculate whether the aforementioned condition (7) is satisfied. For example, in the publicly known embodiment 3 of the above invention, the magnification is 1.538, which is lower than that of this invention, and the values for formula (6) are ±0.006. However, because $$FT = 36.02$$

$$BT = -36.38$$

$$FW = 55.96$$

$$BW = -25.2,$$

the value obtained for formula (4) is:

$(FW+BW)/FW^2-(FT+BT)/FT^2=0.0101>+0.0-06$ which does not satisfy condition (7). If such an optical system were used for changing magnification in pseudo focal length mode, vignetting would occur in the periphery of the screen in the magnified mode. Such an optical system is not appropriate.

In addition, all of Patent Nos. H1-319723, H1-319724 and H1-319725 encompass the type of conventional finder optical system having a pantaprism and variable focal length for the eye piece. In spite of having small magnifications of less than 1.2, all of these barely satisfy the aforementioned condition (7). If a further increase in magnification change ratio were attempted using similar methods, condition (7) would no longer be satisfied.

Further, a trimming magnification of less than 1.2 has very little enlarging effect in terms of finished photos. In order for an effect to be felt, the enlargement must be twice as large in terms of area; namely, the trimming magnification must be approximately 1.4 or larger.

With these publicly known methods, construction of an optical system having a magnification change ratio of 1.4 or larger is difficult in itself. Even if such an optical system were developed, the movement of the finder entrance pupil would be significant, and therefore condition (7) would not be met. The following table shows the calculations for these known methods (provided, however, they are all for the first embodiments of the known methods).

| EZ | Values for formula (6) | Values for formula (4) |
|---|---|---|
| H1-319723 1.10 | ±0.0018 | +0.0019 |
| H1-319724 1.11 | ±0.0019 | +0.0015 |
| H1-319725 1.17 | ±0.0025 | +0.0027 |

As can be seen from this table, while H1-319724 barely satisfies the condition, both H1-319723 and H1-319725 do not.

Now, if first condenser 9 in FIG. 1 of the embodiment of the present invention were not present, the light rays could not be bent in the direction of the entrance pupil of finder optical system 3 solely by means of the Fresnel lens on focusing screen 8 as in FIG. 5, because the distance to the finder entrance pupil would be too short (approximately 50 mm) when so designed, i.e., without the condenser. Hence, first condenser 9 is introduced in order to play the role of further bending the light rays bent by the Fresnel lens. When first condenser 9 is added to the finder optical system, the position of the entrance pupil for finder optical system 3 will be in the range of approximately 95 mm (in wide-angle mode) to 110 mm (in telephoto mode).

The position of the entrance pupil is then adjusted by the second condenser 16 so that condition (7) can be satisfied.

Next, specific lens structure data are described. Provided, however, in this embodiment, ri(i=1, 2, 3, ...) refers to the radius of curvature of the ith surface counted from the object side, as shown in FIG. 2, and di(i=1, 2, 3, ...) to the ith axial distance counted from the object side, while Ni(i=1, 2, 3, ...) and vi(i=1, 2, 3, ...) refer to the refractive power and Abbe number of the ith lens counted from the object side in relation to the D line, respectively. Γ refers to the finder magnification (i.e., the magnification of the finder optical system only) when the focal length of photo-taking lens is 50 mm. Respective variable distances for each value of Γ are also shown.

The asterisk marked on the radius of curvature of this embodiment indicates that the corresponding surface is aspherical. The shape of the aspherical surface is expressed by the following formula:

$$X = \frac{CO \cdot Y^2}{1 + \sqrt{1 - \epsilon \cdot CO^2 \cdot Y^2}} + \Sigma A_i Y^i$$

In this formula,

Y: Distance in the direction perpendicular to the optical axis

X: Displacement at distance Y from the peak of the aspherical surface in the direction parallel to the optical axis CO: Curvature at the peak of the aspherical surface (=1/r, provided r:radius of curvature)

$\epsilon$: Conicoid parameter

Ai: Aspherical coefficient of ith surface

| [radirs of curvature] | | [axial destance] | | [refractive power] | [Abbe number] |
|---|---|---|---|---|---|
| r1 | Fresnel | d1 | 1.500 | N1 1.4914 | v1 57.82 |
| r2 | diffusing surface | d2 | 0.500 | | |
| r3 | 94.160 | d3 | 4.300 | N2 1.4914 | v2 57.82 |
| r4 | −199.144 | d4 | 38.200 | | |
| r5 | −27.051 | d5 | 1.000 | N3 1.805 | v3 40.97 |
| r6 | 818.000 | d6 | T5 (variable) | | |
| r7* | 17.125 | d7 | 4.000 | N4 1.4914 | v4 57.82 |
| r8 | −28.243 | d8 | T7 (variable) | | |
| r9 | 13.433 | d9 | 4.000 | N5 1.4914 | v5 57.82 |
| r10* | −21.921 | d10 | 0.500 | | |
| r11 | 23.361 | d11 | 1.300 | N6 1.84666 | v6 23.82 |
| r12 | 8.241 | d12 | T11 (variable) | | |
| r13 | 64.144 | d13 | 3.000 | N7 1.584 | v7 31 |
| r14 | −21.186 | d14 | 0.500 | | |
| r15 | ∞ (field frame) | d15 | 19.246 | | |
| r16 | 25.394 | d16 | 1.200 | N8 .1.7985 | v8 22.6 |
| r17 | 18.761 | d17 | 0.800 | | |
| r18* | 17.304 | d18 | 4.500 | N9 1.4914 | v9 57.82 |
| r19 | −17.365 | d19 | 15.000 | | |
| r20 | ∞ (pupil) | | | | |

| Aspherical surface | [$\epsilon$] | [A4] | [A6] | [A8] |
|---|---|---|---|---|
| r7 | −3.745 | 0 | 0 | 0 |
| r10 | −11.180 | 0 | 0 | 4.8E-09 |
| r18 | 1.000 | −8.5E-05 | 0 | 0 |

| Variable distance | [Γ = 0.72] | [Γ = 1.01] | [Γ = 1.23] |
|---|---|---|---|
| T5 | 22.809 | 16.567 | 13.648 |
| T7 | 1.000 | 3.082 | 1.003 |
| T11 | 19.595 | 23.755 | 28.753 |

FIGS. 4a–4l show aberrations in this embodiment when the finder magnifications (Γ) are 0.72 (wide-angle mode), 1.01 (middle) and 1.23 (telephoto mode), respectively. The dotted lines (T) and solid lines (S) represent the astigmatism at the tangential plane and sagittal plane, respectively. TK indicates the image height on the focal plane.

As described above, when the position of the exit pupil of the photo-taking lens changes due to lens exchange or zooming, the average position of the exit pupil may be considered to lie where the center line of the normal light rays which traverse any location of exit pupil (the shaded area in FIG. 5) and the optical axis cross each other, as shown by the dotted line in FIG. 5.

FIG. 7(b) illustrates the flow of light rays, omitting the relay optical system and eye piece system to permit the easier explanation of the relation of the pupils in this embodiment. FIG. 7(a) shows the flow of light rays with a finder which does not have a relay optical system, as in the case of conventional finders having a pentaprism. This drawing also omits the eye piece system.

In FIG. 7(a), the average exit pupil and finder entrance pupil (eye pupil) are in a conjugate relation, by means of Fresnel lens 28. In FIG. 7(b), the average exit pupil, finder entrance pupil and eye pupil are in a conjugate relation by means of Fresnel lens 28 and condenser 32.

Now, the arrangement of the light-measuring system is considered. The light-measuring system of a single-lens reflex (hereinafter referred to as "SLR") camera is commonly placed in the finder optical system. More specifically, there are two methods: one is to use a portion of the light rays in the finder optical system via a half mirror, etc. placed in the finder's light path, and the other is to place the light-measuring system away from the finder optical axis and use the excess light which does not reach the operator's pupil for light-measuring. In the case of the former, to the extent the light is used for light-measuring purposes, the finder becomes darker. Especially with recent SLR cameras, since the light is also used for focus detection, the finder becomes even darker.

Figure 8:
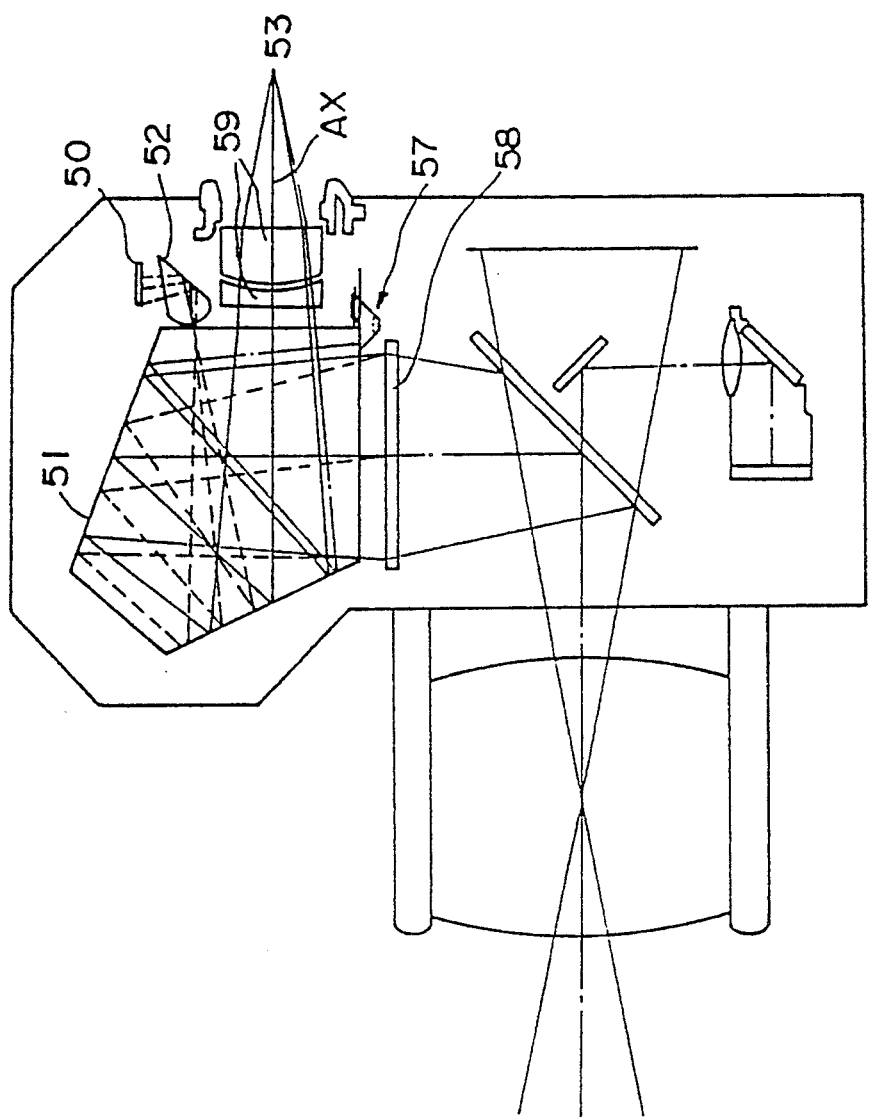
FIG. 8 is a sectional view of a camera having a conventional finder optical system.

FIG. 8 shows the arrangement of a light-measuring system of a conventional SLR camera having a pentaprism 51 in which the latter light-measuring system arrangement is employed. In this figure, 50 is a light-measuring element, 52 is a light-measuring lens, 53 is the pupil position, 57 is an in-finder prism, 58 is a focusing screen, and 59 is an eye piece.

In the SLR camera shown in this figure, the light-measuring optical system is located at the exit surface of pentaprism 51, away from the finder optical axis AX and above or next to eye piece 59.

FIG. 7(a) shows the relative arrangement of the conventional light-measuring optical system S1 illustrated in FIG. 8. $\theta H'$, $\theta C'$ and $\theta L'$ indicate the angles between rays traveling from points PH, PC and PL on focusing screen 8 in the figure toward the finder entrance pupil and those traveling toward light-measuring optical system S1, respectively.

On the other hand, FIG. 7(b) shows, among finders of this embodiment, one in which light-measuring optical system S2 is placed at a certain location away from the finder optical axis AX. $\theta H$, $\theta C$ and $\theta L$, as similarly as described above, are the angles between rays traveling toward the finder entrance pupil and those traveling toward light-measuring optical system S2, respectively.

In both FIGS. 7(a) and 7(b), Fresnel lens 28 has a power which brings the average exit pupil and the finder entrance pupil into a conjugate relation. Therefore, light-measuring optical systems S1 and S2 away from the finder optical axis use a portion of the light diffused by the diffusing surface on the focusing screen.

Recent SLR cameras have low diffusibility on focusing screen 8 in order to make the finder light. When the angle between the rays traveling toward the finder entrance pupil and those traveling toward the light-measuring optical system increases, the luminous intensity obtained by the light-measuring optical system quickly decreases. Significant errors in light-measuring also occur where the luminous intensity obtained by the light-measuring optical system fluctuates according to the location of the exit pupil of the photo-taking lens.

In the case of a light-measuring optical system S1 in FIG. 7(a), the finder entrance pupil and the light-measuring optical system S2 are located apart from each other. Because of this, $\theta L'$ is considerably larger than $\theta H'$, and the light from PL is dimmer than the light from PH. This is an imbalanced system in which the light-measuring sensitivity varies depending on where the light is coming from on the focusing screen. The degree of error in light-measuring is also substantial.

In the case of light-measuring optical system S2 in FIG. 7(b), the light-measuring optical system S2 is located close to the finder entrance pupil, and $\theta H$, $\theta C$ and $\theta L$, the angles from PH, PC and PL on the focusing screen to the light-measuring optical system, respectively, are almost identical, permitting a system without irregularities in sensitivity. Moreover, the location of the finder entrance pupil is the point where the finder light path is narrowest. Therefore, if a light-measuring optical system S2 is placed in a position in which it avoids vignetting of the finder light path, it can come closest to the finder optical axis, and the absolute angles of $\theta H$, $\theta C$ and $\theta L$ also become smaller than angles $\theta H'$, $\theta C'$ and $\theta L'$ of S1.

Therefore, even if the diffusibility of the focusing screen is low to a certain extent, high sensitivity can be obtained from the light-measuring element.

In a conventional SLR camera having no relay optical system (FIG. 8), placing light-measuring optical system S2 close to the finder pupil would mean placing light-measuring optical system S2 right next to the eye of the operator, which naturally means locating it outside the camera body. This is physically impossible.

In this embodiment having a relay optical system, because the relay system pupil is invariably positioned in the relay optical system inside the camera body, the light-measuring optical system can be placed outside the finder light path and close to the relay system pupil in the relay optical system. A light-measuring optical system with high sensitivity and reliability can be created.

In this embodiment, since the pupil of the relay optical system is in the vicinity of third mirror 13, the light-measuring optical system should be located in this vicinity. In other words, this is the desirable arrangement for TTL light measurement in a finder optical system for SLR cameras equipped with a pseudo focal length mode.

Figure 9:
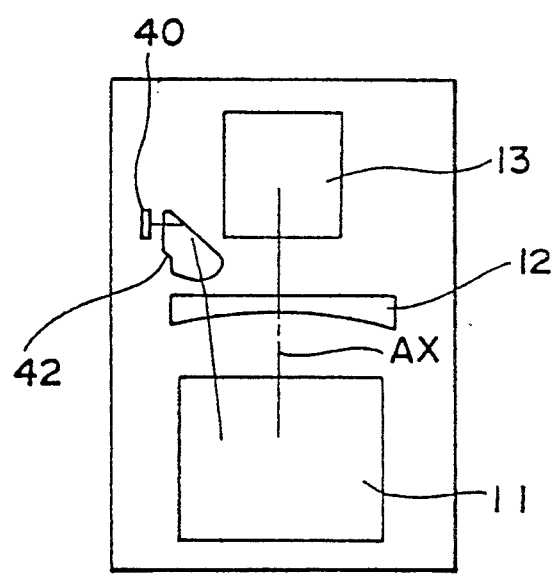
FIG. 9 is a sectional view of the camera cut from Z to Z' as shown in FIG. 1, showing the location of the light-measuring optical system.

A specific example of arrangement of a light-measuring optical system is shown in FIG. 9. This is the Z—Z' cross section shown in FIG. 1, seen from the object side. A light-measuring optical system comprising light-measuring element 40 and light-measuring lens 42 is located between auxiliary lens 12 and third mirror 13 and away from the finder optical axis AX.

Figure 11:
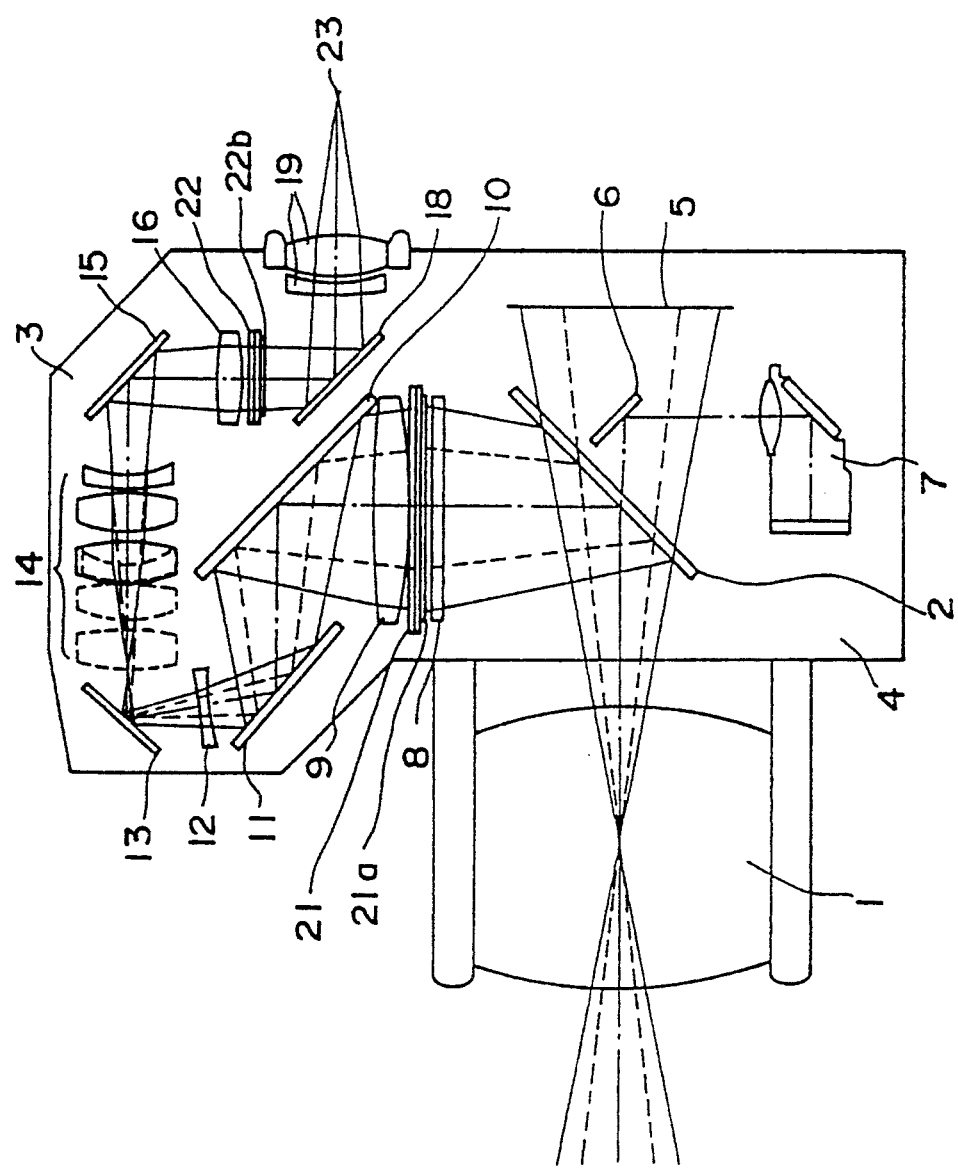
FIG. 11 is a sectional view of a camera having a finder optical system as represented in the first embodiment of the present invention and liquid crystal display devices.

Next, an in-finder display using liquid display devices (LCDs) are described. FIG. 11 illustrates a camera in FIG. 1 where LCDs are employed for an in-finder display. Specifically, first LCD 21 is located in the vicinity of the primary image, between focusing screen 8 and condenser 9. Second LCD 22 is located close to the secondary image and to the pupil side of condenser 16. Here, first and second LCDs 21 and 22 both use TN (twisted nematic) liquid crystal. First LCD 21 includes polarized light filter 21a on the side of focusing screen 8 and second LCD 22 includes polarized light filter 22b on the side of fifth mirror.

In general, in order to display information by means of a TN liquid crystal, two polarized light filters are placed below and above glass sheets with liquid crystal between them and, for example, the directions of polarization of the two filters are made perpendicular. This enables a positive display in which light is transmitted in an electrically non-charged state. The LCDs of this embodiment each have only one polarized light filter; however, reciprocal use of the other's filter makes information display possible. Moreover, compared with the case where both first and second LCDs 21 and 22 each have two polarized light filters, the reduction in light amount due to the filters is smaller, and manufacturing costs is lower as well. Polarized light filters 21a and 22b are optically parallel to each other in the direction of polarization. In FIG. 11, the direction of polarization of both filters is in the horizontal direction of the camera (or perpendicular to the sheet).

FIGS. 10(a) and 10(b) show the general operational principles of TN liquid crystal devices. FIG. 10(a) illustrates a display device wherein LCD 20 is not electrically charged. FIG. 10(b) shows a display device wherein LCD 20 is electrically charged. In both figures, in relation to incident light coming from below, polarized light filter 20a transmits polarized light having a direction of polarization perpendicular to the sheet only.

In the situation presented by FIG. 10(a), in which the LCD is not electrically charged, the plane of polarization of transmitted light rotates 90 degrees as a result of the optical rotation taking place at the TN liquid crystal in LCD 20 and changes into polarized light having a direction of polarization parallel to the sheet. Coinciding with polarized light filter 20b in the direction of polarization, this polarized light passes through polarized light filter 20b.

In the situation presented by FIG. 10(b), in which the LCD is electrically charged, optical rotation at the TN liquid crystal in LCD 20 does not occur. Therefore, because the direction of polarization of the transmitted light remains perpendicular to the sheet, the light is intercepted by a polarized light filter 20b.

Figure 12C:
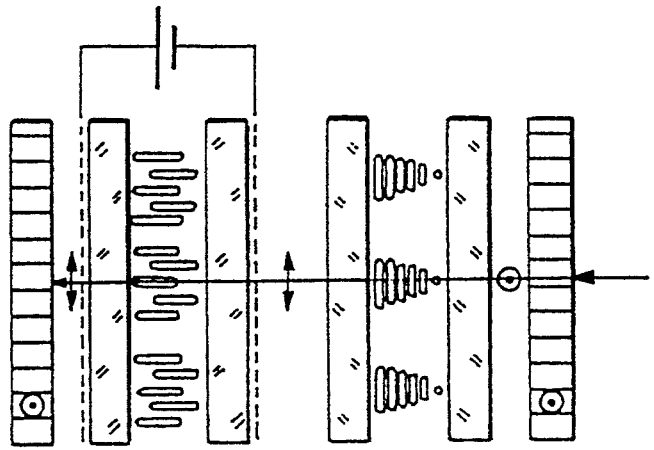
FIGS. 12a, 12b, and 12c are an explanatory illustration of the operating principles of TN liquid crystals used in the camera shown in FIG. 11.
Figure 12B:
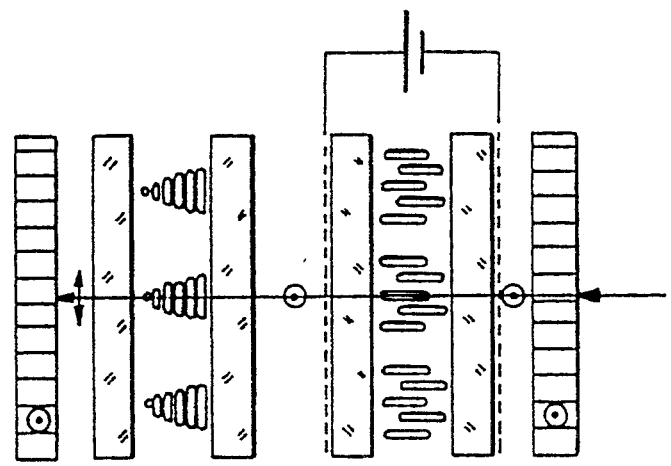
Figure 12A:
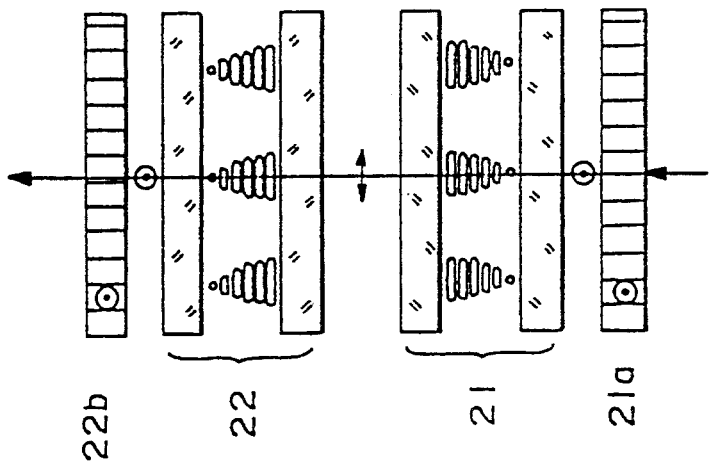

FIGS. 12(a) through 12(c) show the operational principles of first and second LCDs 21 and 22 of this embodiment. FIG. 12(a) illustrates a display device where neither a first LCD 21 nor a second LCD 22 is electrically charged. FIG. 12(b) shows a display device where only the first LCD 21 is electrically charged and FIG. 12(c) a display device where only the second LCD 22 is electrically charged. The display device in FIGS. 12(a) through 12(c), in relation to incident light coming from below, transmits through polarized light filter 21a polarized light having a direction of polarization perpendicular to the sheet only.

In FIG. 12(a), since neither the first LCD 21 nor the second LCD 22 is electrically charged, the TN liquid crystal of both LCDs performs optical rotation. Therefore, when it has passed through first LCD 21, incident polarized light changes into polarized light having a direction of polarization parallel to the sheet, and after traversing second LCD 22 it changes its direction of polarization to that perpendicular to the sheet. Coinciding with polarized light filter 22b in the direction of polarization, this polarized light passes through the filter.

In FIG. 12(b), while first LCD 21 is electrically charged and optical rotation does not take place, optical rotation does happen at second LCD 22. Therefore, the incident light remains polarized, with a direction of polarization perpendicular to the sheet when passing first LCD 21, and changes into polarized light having a direction of polarization parallel to the sheet when passing second LCD 22. Then it is intercepted by polarized light filter 22b.

In FIG. 12(c), while second LCD 22 is electrically charged and optical rotation does not take place with this LCD, optical rotation does occur at first LCD 21. Therefore, the incident light changes into polarized light having a direction of polarization parallel to the sheet when passing through first LCD 21 and remains as such when passing through second LCD 22. Then it is intercepted by polarized light filter 22b. In other words, in the finder, the liquid crystal display segments in which either first LCD 21 or second LCD 22 is electrically charged appear dark due to their impermeability; other than that, the object can be observed through the photo-taking lens.

In this embodiment, display segments of first LCD 21 and those of second LCD 22 are not observed simultaneously in the finder, or both LCDs are not electrically charged at the same time.

Figure 13:
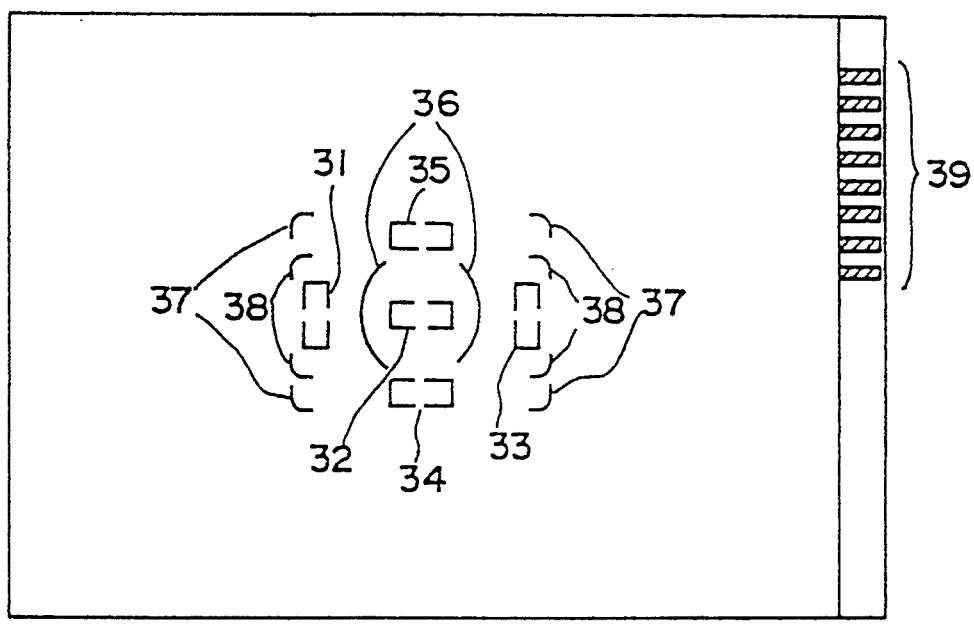
FIG. 13 is an explanatory illustration showing all display segments of the first liquid crystal display device of the camera shown in FIG. 11.
Figure 14:
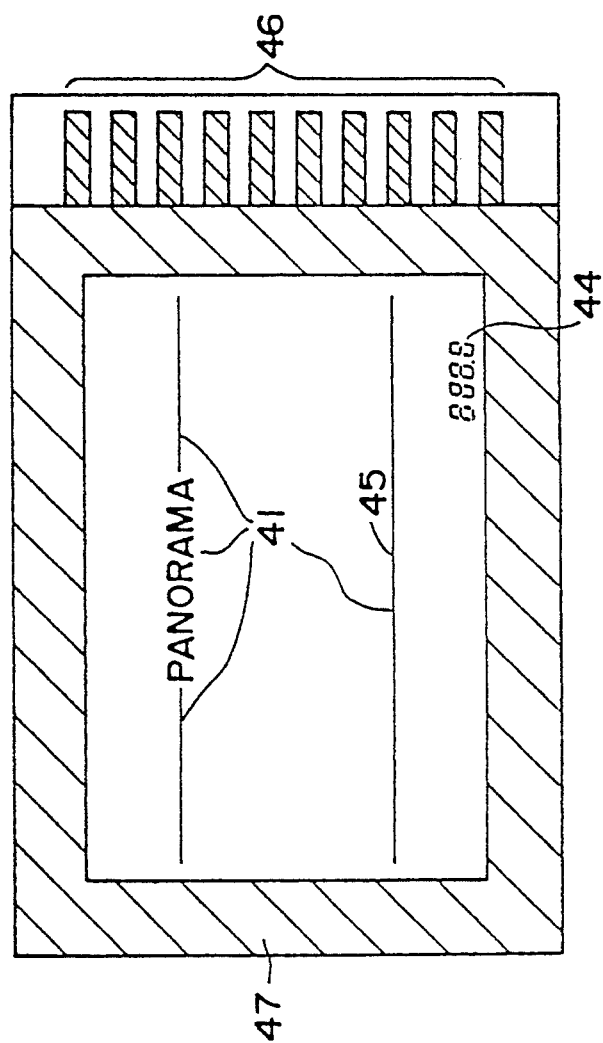
FIG. 14 is an explanatory illustration showing all display segments of the second liquid crystal display device of the camera shown in FIG. 11.

FIG. 13 shows the situation in which all display segments of first LCD 21 are illuminated. FIG. 14 shows the situation in which all display segments of second LCD 22 are illuminated. Although second LCD 22 in FIG. 14 is smaller than first LCD 21 in FIG. 13 in actuality (at approximately one-third the size of first LCD 21), it is shown in an enlarged size here for easy understanding.

31 through 35 in FIG. 13 are display segments which show focus detection areas controlled by AF sensor module in FIG. 1. One of them can be selected through an operation to select a focus detection area. 37 is a first focus detection frame which includes all focus detection areas 31 through 35. 38 is a second focus detection frame which includes the three horizontally aligned focus detection areas 31, 32 and 33. 36 is a display segment to show the spot light-measuring area where the light in the small central portion is measured by a light-measuring device. Because AF sensor module 7 and the light-measuring device have pre-determined ranges of focus detection and light measurement, respectively, in relation to the primary surface on focusing screen 8, the ranges of focus detection and light measurement in relation to the second image surface change based on the change in magnification between the two image surfaces effected by the movement of zoom relay lens system 14.

Therefore, display segments related to the ranges of focus detection and light measurement, which have fixed relations to the primary image surface, are included in first LCD 21 in FIG. 13. 39 is terminals for the electrical connection of first LCD 21.

The shaded area 47 in FIG. 14 is a field frame and is situated so as to shield second LCD 22 from light at all times. This field frame 47 comprises vapor depositions of aluminum, etc., separately from liquid crystal display segments. 41 is a display segment which shows a panorama-mode field frame from which a horizontally long print is obtained with the range without the upper and lower portions of the screen as the photo screen. 44 is a display segment to display shutter speed and stop setting. 46 is terminals for the electrical connection of second LCD 22.

FIG. 15 shows some of the in-finder displays.

Figure 15A:
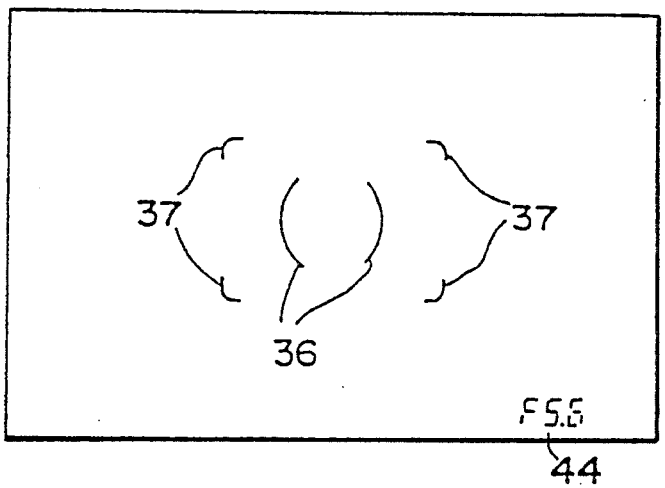
FIGS. 15a, 15b, and 15c are an explanatory illustration of in-finder display observed in the camera shown in FIG. 11.

FIG. 15(a) is how the display appears when the finder optical system is in wide-angle mode (or not in pseudo focal length mode). First focus detection frame 37 and spot light-measuring area 36 are displayed by first LCD 21 and stop setting 44 is displayed by second LCD 22.

Figure 15B:
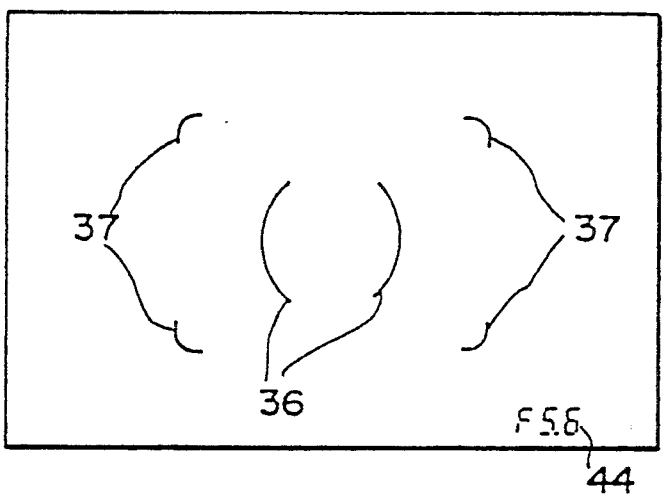

FIG. 15(b) is how the display appears when the finder optical system is in telephoto mode (or pseudo focal length mode). The same displays are seen for both first and second LCDs as in FIG. 15(a). In FIG. 15(b), however, since the primary image is enlarged by the magnification change of zoom relay lens system 14, both first focus detection frame 37 and spot light-measuring area 36 are displayed enlarged, but stop setting 44 is shown in the same size and location as in FIG. 15(a).

Figure 15C:
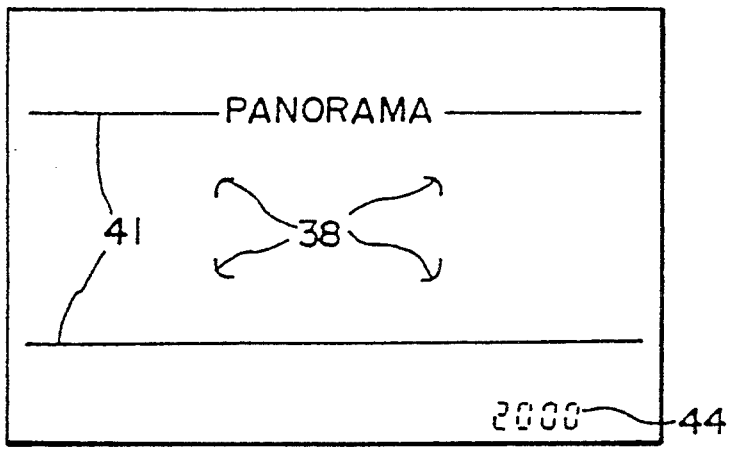

FIG. 15(c) shows the appearance of the display in panorama mode. Second focus detection frame 38, shutter speed 44 and panorama-mode field frame 41 are shown.

Figure 16:
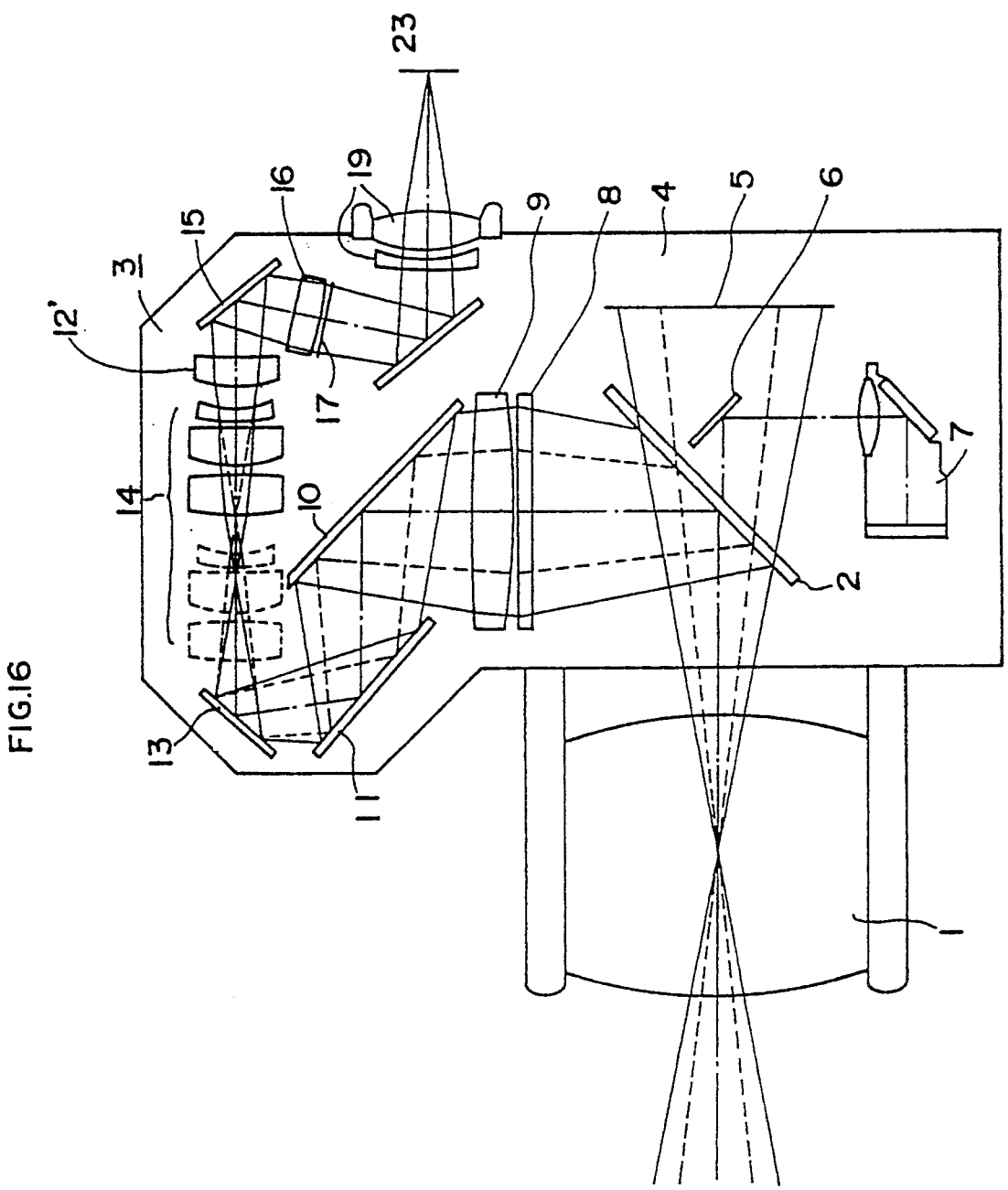
FIG. 16 is a sectional view of a camera having a finder optical system as represented in the second embodiment of the present invention.

Finally, FIG. 16 shows an embodiment in which auxiliary lens 12' is placed on the pupil side of zoom relay lens system 14.

In this embodiment, by reducing the image re-formed by zoom relay lens system 14 using auxiliary lens 12' having positive refractive power, the entire relay optical system constitutes a reduction-based optical system. In this structure, due to the alignment of zoom relay lens system 14 and auxiliary lens 12', the mechanism becomes a little longer than the above described embodiment. However, since the distance between second mirror 11 and third mirror 13 can be narrowed, the height can be reduced.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A finder optical system comprising:
   a photo-taking lens;
   a mirror which reflects light rays passed through the photo-taking lens;
   a focusing screen on which a first object image is formed from the light rays;
   a relay lens system through which the first object image is reformed as a second object image smaller than the first object image, said relay lens system being located parallel to an optical axis of the photo-taking lens;
   means for leading light rays from the focusing screen to the relay lens system;
   an eye piece which enlarges the second object image, and
   means for displaying picture-taking data in a viewfinder, said displaying means having a display data image generating device and a forming device which forms a small image of the display data generating device at a position having the same distance from the eye piece as the second object image.

2. A finder optical system claimed in claim 1, wherein the auxiliary lens consists of a negative single lens element.

3. A finder optical system claimed in claim 1, wherein a ratio of the second object image to the scaled down first object image is smaller than 1 at the wide-angle end of the zoom relay lens system and the ratio is larger than 1 at the telephoto end of the zoom relay lens system.

4. A finder optical system claimed in claim 1, wherein the zoom relay lens system reforms the second object image smaller than the first object image.

5. A finder optical system comprising:
   a photo-taking lens;
   a mirror which reflects light rays passed through the photo-taking lens upward;
   a focusing screen on which a first object image is formed;
   a zoom relay lens system through which the first object image is reformed as a second object image;
   an auxiliary lens which makes the second object image scale down as compared with a case without the auxiliary lens, said auxiliary lens being located behind of the zoom relay lens system; and
   an eye piece which enlarges the second object image.

6. A finder optical system claimed in claim 5, wherein the auxiliary lens consists of a positive single lens element.

7. A finder optical system claimed in claim 1, wherein the zoom relay lens system reforms the second object image smaller than the first object image.

8. An improved finder optical system for a camera, comprising:
   a plurality of optical elements collectively forming a finder optical system having a zoom ratio greater than 1.2, the finder optical system satisfying the following condition:

$$-(0.0107EZ - 0.01) \leq (FW + BW)/FW2 - (FT + BT)/FT2 \pm (0.0107EZ - 0.01)$$

wherein EZ is represented as the zoom ratio;
   FW is represented as a distance from a focusing surface to a front principal point of the finder optical system at a wide-angle mode;
   FT is represented as a distance from the focusing surface to the front principal point of the finder optical system at a telephoto mode;
   BW is represented as a distance from a pupil surface to a rear principal point of the finder optical system at the wide angle mode; and
   BT is represented as a distance from the pupil surface to the rear principal point of the finder optical system at the telephoto mode.

9. A finder optical system claimed in claim 8, further comprising a focusing screen and a relay lens system through which a first object image on the focusing screen is reformed as a second object image and an eye piece which enlarges the second object image.

10. A finder optical system claimed in claim 9, further comprising a condenser lens element located at a vicinity of the second object image and wherein a refractive power of the condenser lens element is adjusted in order that the finder optical system satisfies the condition.

11. A finder optical system claimed in claim 10, wherein the finder optical system satisfies the following condition:

$$EXT = (\beta W - \beta T)/(\beta W \cdot \phi W - \beta T \cdot \phi T)$$

wherein EXT is represented as a position of an exit pupil of the relay lens system measured from the second object image;

βW is represented as a magnification of the relay lens system at a wide-angle mode;

βT is represented as a magnification of the relay lens system at a telephoto mode;

φW is represented as a refractive power of the relay lens system at the wide-angle mode; and φT is represented as a refractive power of the relay lens system at the telephoto mode.

* * * * *

UNITED STATES PATENT AND TRADEMARK OFFICE
CERTIFICATE OF CORRECTION

PATENT NO. : 5,363,163
DATED : November 8, 1994
INVENTOR(S) : Kohtaro Hayashi et al It is certified that error appears in the above-indentified patent and that said Letters Patent is hereby corrected as shown below:

On the cover page, after "[75] Inventors:" delete "Yoshinuobu Kudo, Osaka,".

Signed and Sealed this

Fourth Day of April, 1995

Attest:

BRUCE LEHMAN

Attesting Officer      Commissioner of Patents and Trademarks